United States Patent
Mouly et al.

(10) Patent No.: US 12,221,931 B2
(45) Date of Patent: Feb. 11, 2025

(54) AIRCRAFT TURBOMACHINE WITH MECHANICAL REDUCTION GEAR

(71) Applicant: Safran Transmission Systems, Colombes (FR)

(72) Inventors: Guillaume Pierre Mouly, Moissy-Cramayel (FR); Guillaume Julien Beck, Moissy-Cramayel (FR); Jordane Emile Andre Peltier, Moissy-Cramayel (FR); Jean-Pierre Serey, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/465,630

(22) Filed: Sep. 12, 2023

(65) Prior Publication Data

US 2024/0084738 A1     Mar. 14, 2024

(30) Foreign Application Priority Data

Sep. 13, 2022   (FR) ..................................... 2209158

(51) Int. Cl.
*F16H 57/08* (2006.01)
*F02C 7/36* (2006.01)
(Continued)

(52) U.S. Cl.
CPC ................. *F02C 7/36* (2013.01); *F16H 1/28* (2013.01); *F16H 57/0456* (2013.01);
(Continued)

(58) Field of Classification Search
CPC ........ F16H 1/28; F16H 57/0456; F16H 57/08; F16H 2057/085; F16H 2001/2881;
(Continued)

(56) References Cited

U.S. PATENT DOCUMENTS

2013/0225353 A1    8/2013   Gallet et al.
2021/0254659 A1*   8/2021   Brillon .................... F16C 17/02
(Continued)

FOREIGN PATENT DOCUMENTS

DE     102017120336 B3    9/2018
FR         2987416 A1     8/2013
(Continued)

OTHER PUBLICATIONS

Preliminary Research Report received for French Application No. 2209158, mailed on Mar. 29, 2023, 3 pages (1 page of French Translation Cover Sheet and 2 pages of original document).

*Primary Examiner* — Roger L Pang
(74) *Attorney, Agent, or Firm* — WOMBLE BOND DICKINSON (US) LLP

(57) ABSTRACT

An aircraft turbomachine including a mechanical reduction gear including one sun gear, a ring gear, planet gears which are meshed with the sun gear and the ring gear, each planet gear including a first toothing for meshing with the sun gear, and a second toothing for meshing with the ring gear, the first toothing of each planet gear having a diameter greater than that of the second toothing of the planet gear, and a planet carrier, wherein the sun gear is coupled to a first rotor shaft of the turbomachine, the planet carrier is coupled to a second rotor shaft of the turbomachine, the ring gear is fixed to a stator of the turbomachine.

9 Claims, 10 Drawing Sheets

(51) Int. Cl.
*F16H 1/28* (2006.01)
*F16H 57/04* (2010.01)

(52) U.S. Cl.
CPC .... *F16H 57/08* (2013.01); *F05D 2260/40311* (2013.01); *F16H 2001/2881* (2013.01); *F16H 2057/085* (2013.01)

(58) Field of Classification Search
CPC .... F16H 2001/289; F16H 57/082; F02C 7/36; F02C 7/06; F05D 2260/40311; F05D 2240/61
USPC ................................. 475/331, 338, 339, 341
See application file for complete search history.

(56) References Cited

U.S. PATENT DOCUMENTS

| | | |
|---|---|---|
| 2021/0310417 A1 | 10/2021 | Hrubec et al. |
| 2021/0388769 A1 | 12/2021 | Beck et al. |
| 2022/0325669 A1* | 10/2022 | Piazza ...................... C21D 1/76 |
| 2023/0142715 A1* | 5/2023 | Hrubec .................... F02C 7/36 |
| | | 415/122.1 |
| 2024/0026955 A1* | 1/2024 | Mastellone ............... F16H 1/28 |

FOREIGN PATENT DOCUMENTS

| | | |
|---|---|---|
| FR | 3008462 A1 | 1/2015 |
| FR | 3008463 A1 | 1/2015 |
| FR | 3041054 A1 | 3/2017 |
| WO | 2010/092263 A1 | 8/2010 |

* cited by examiner

[Fig.1]
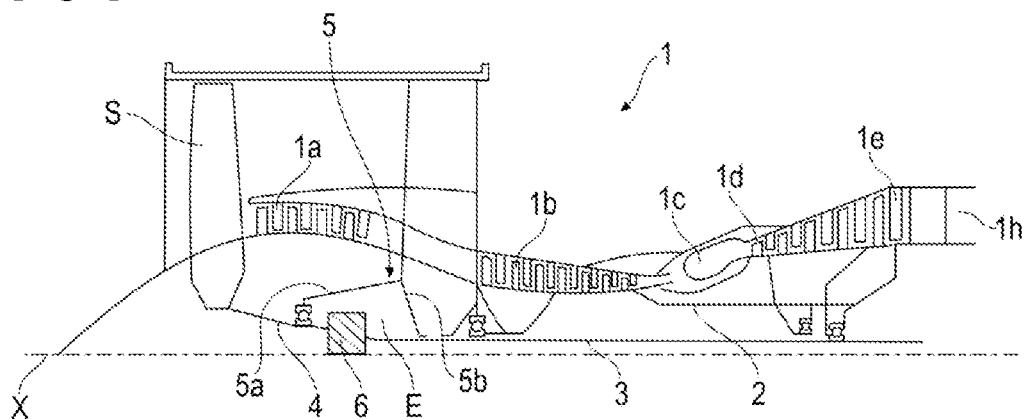

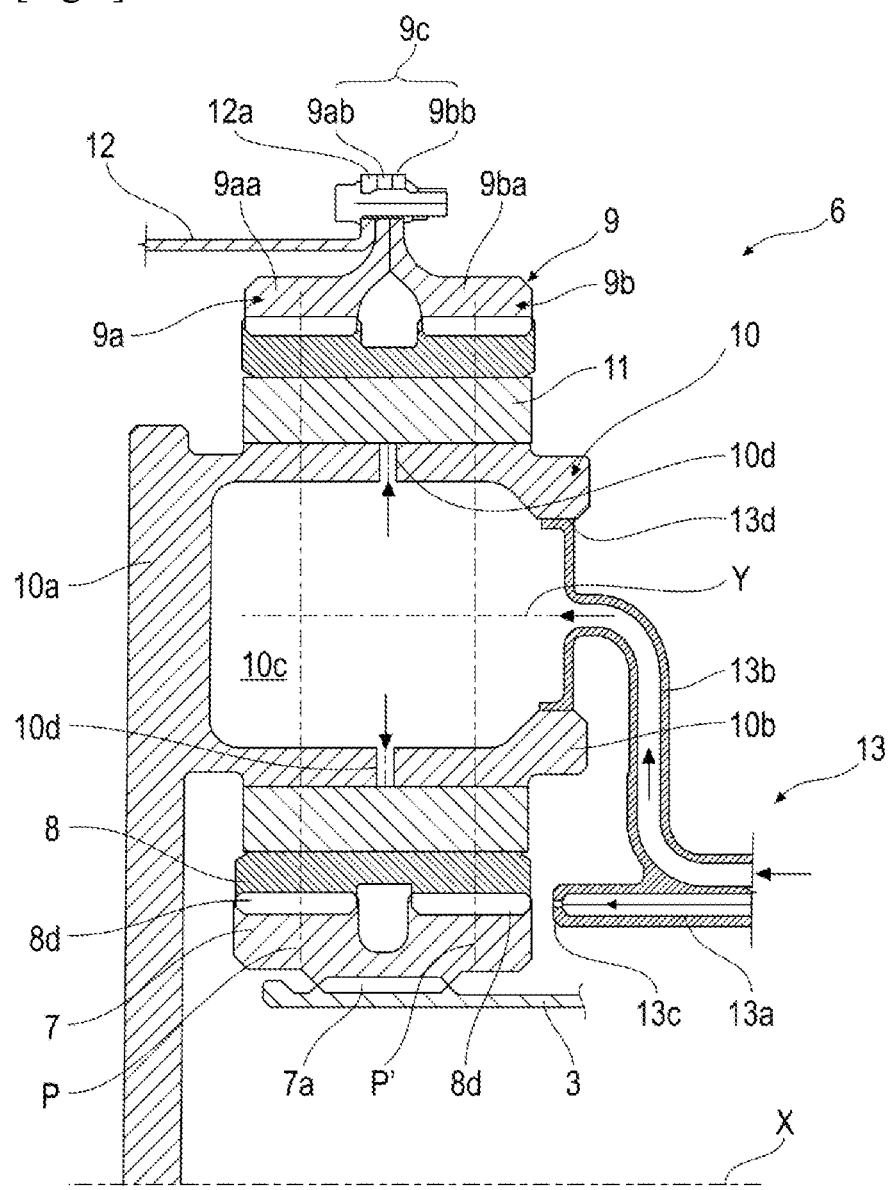
[Fig.2]

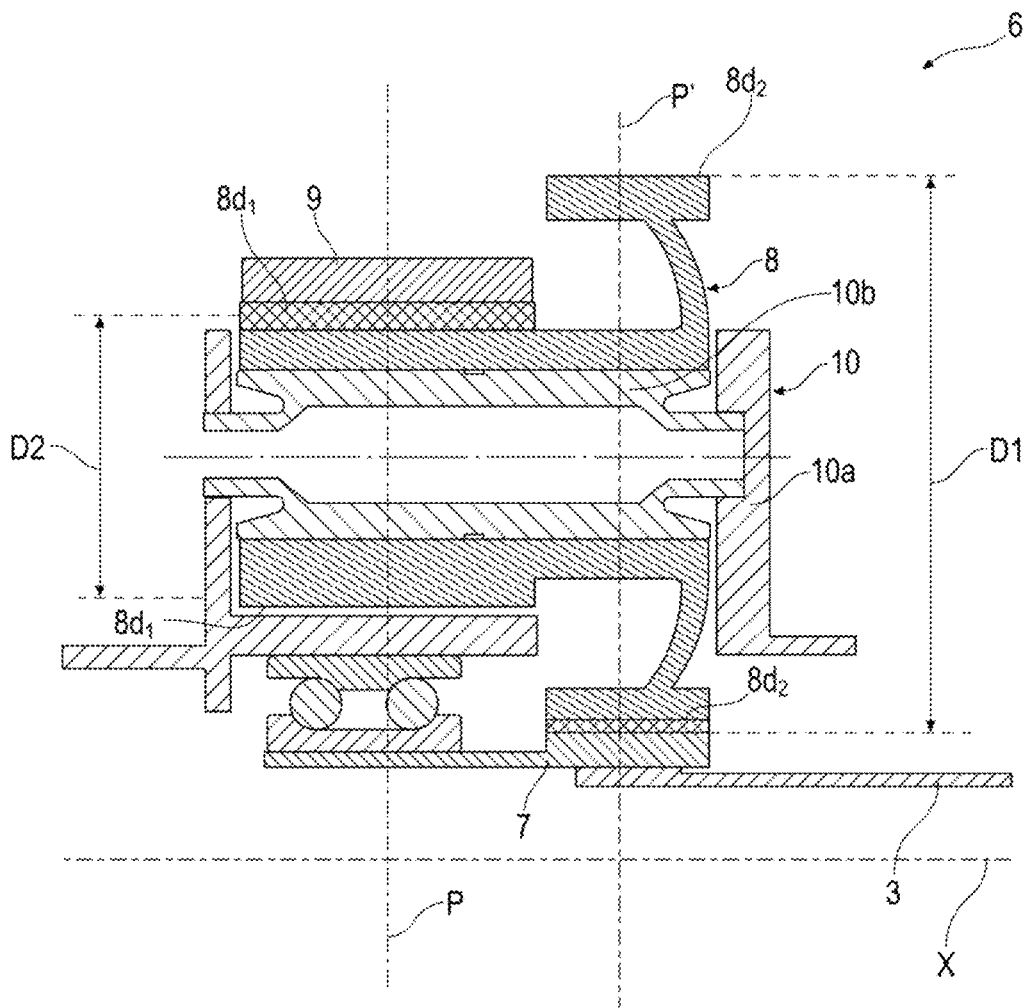
[Fig.3]
-- Prior Art --

[Fig.4]
-- Prior Art --
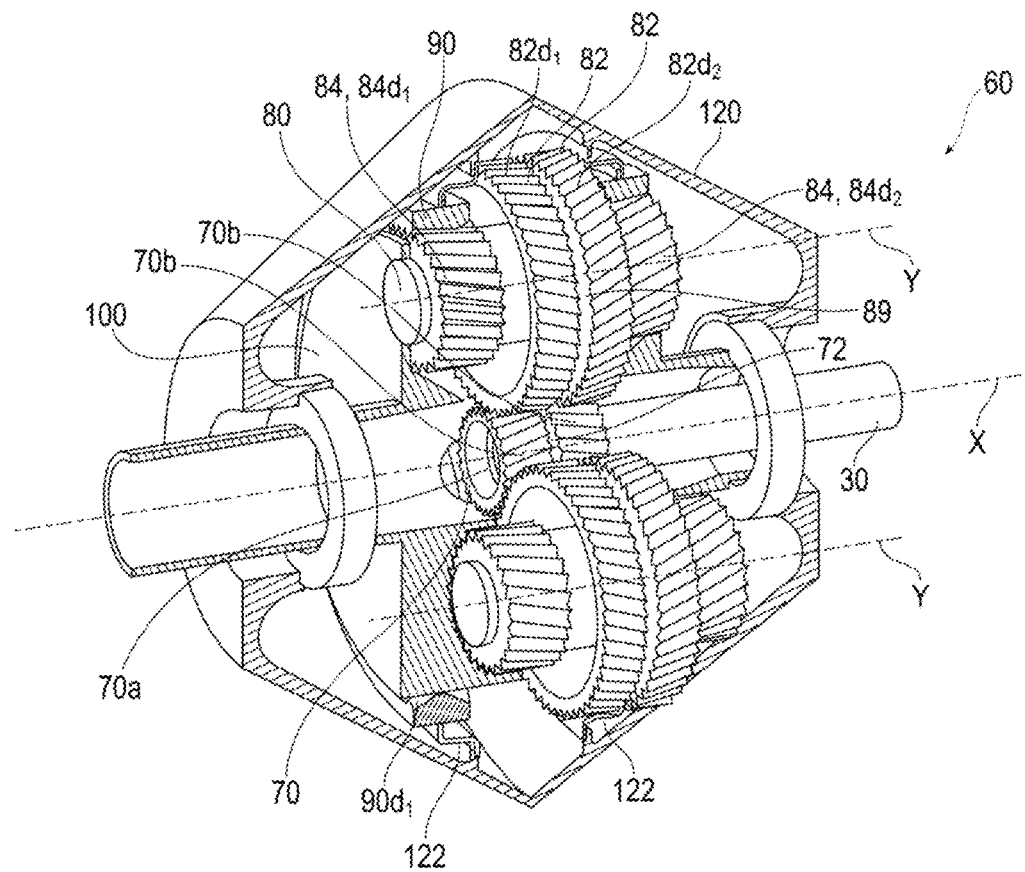

[Fig.5]
-- Prior Art --
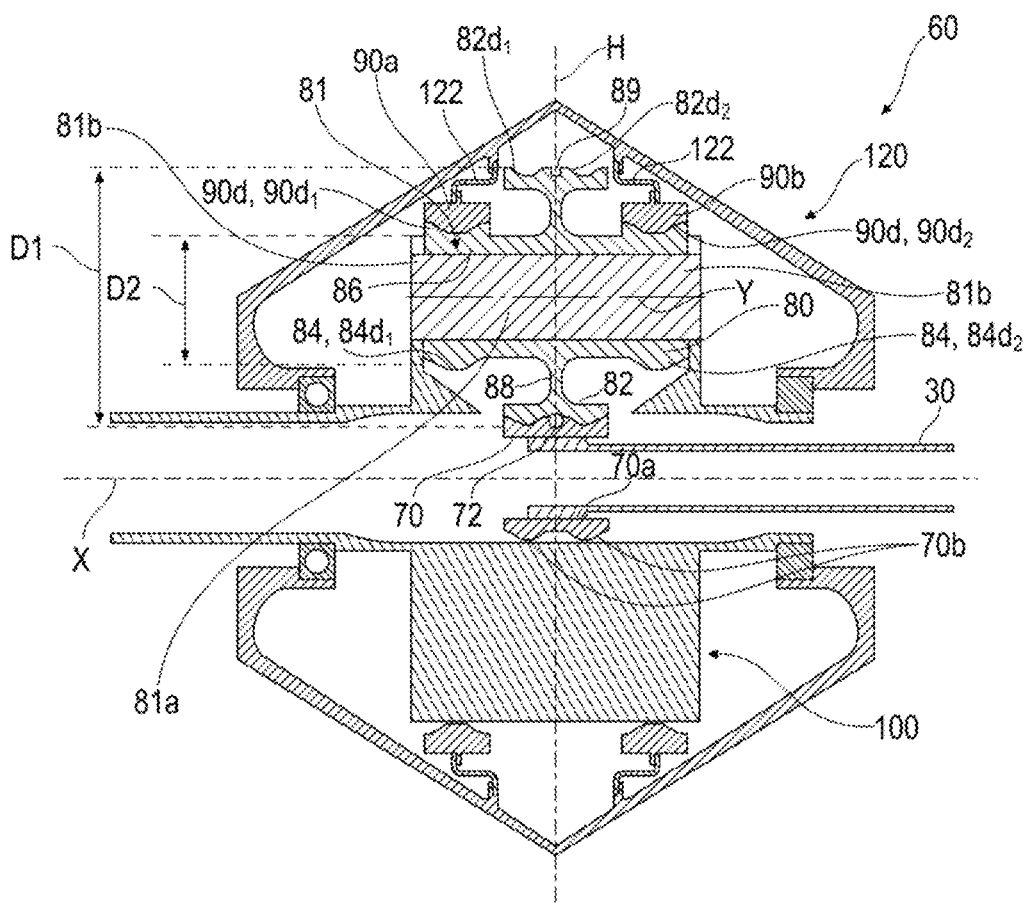

[Fig.6]
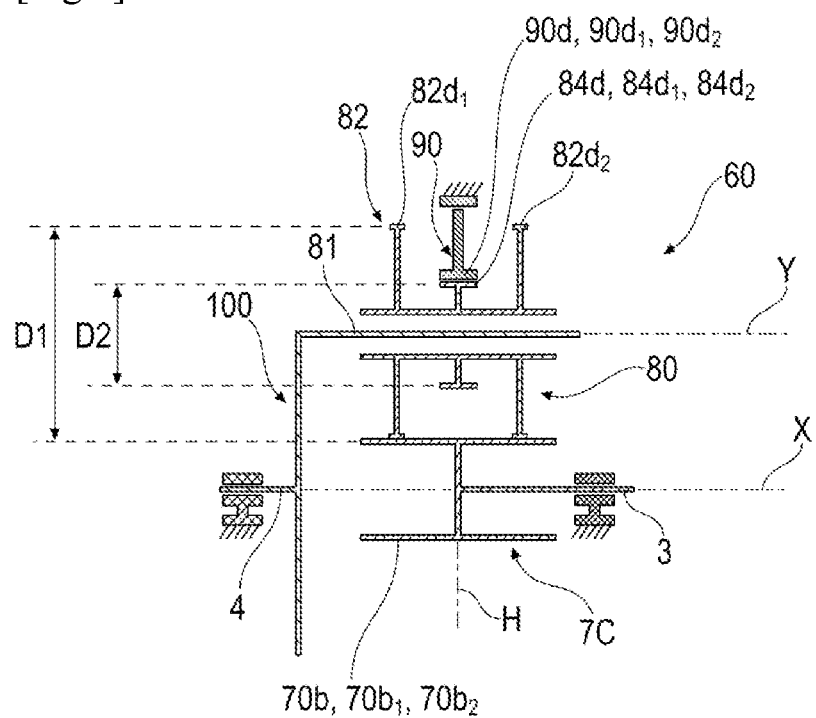

[Fig.7]
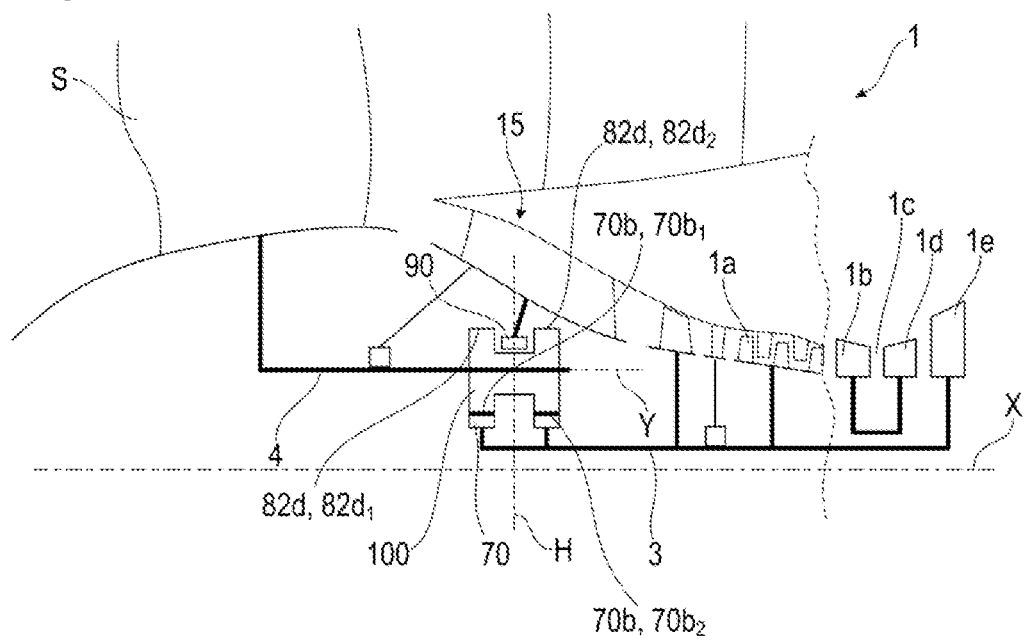

[Fig.8]
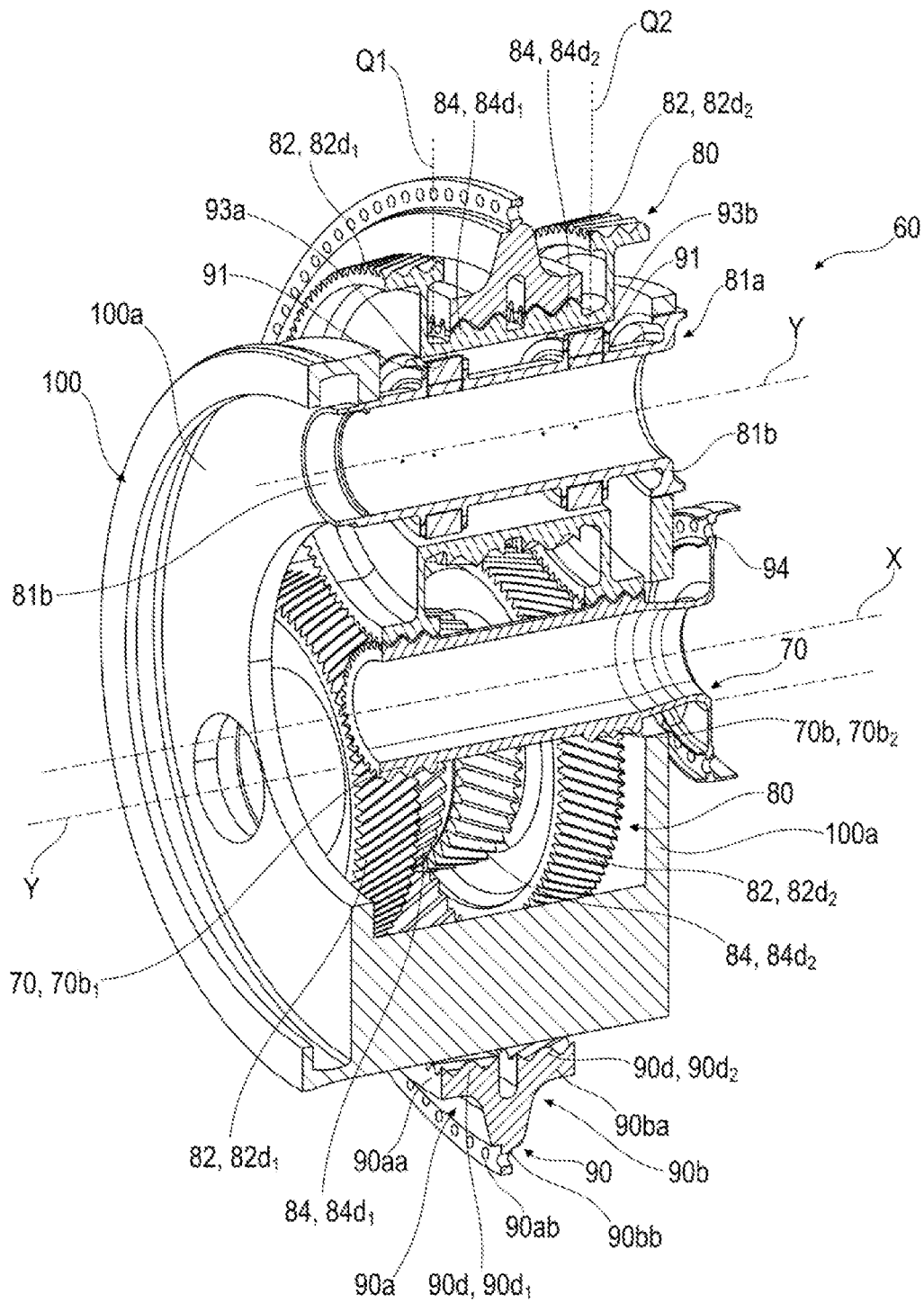

[Fig.9]
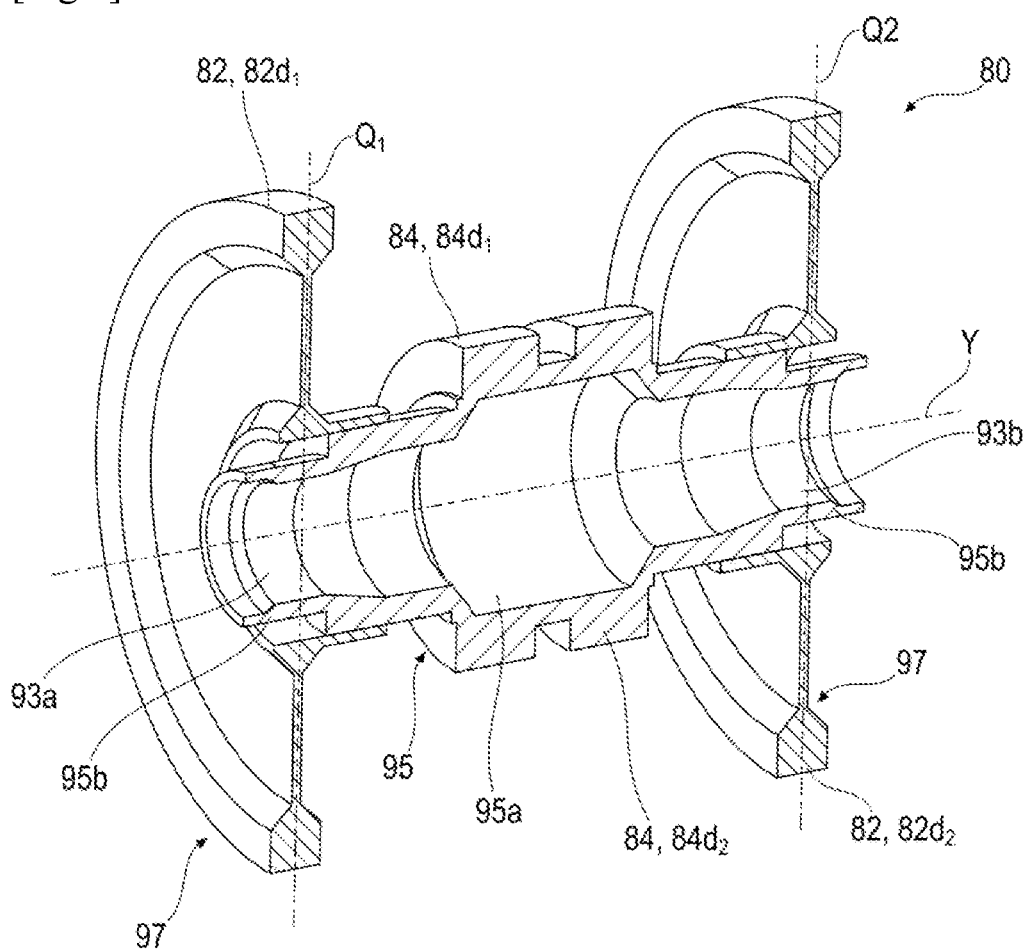

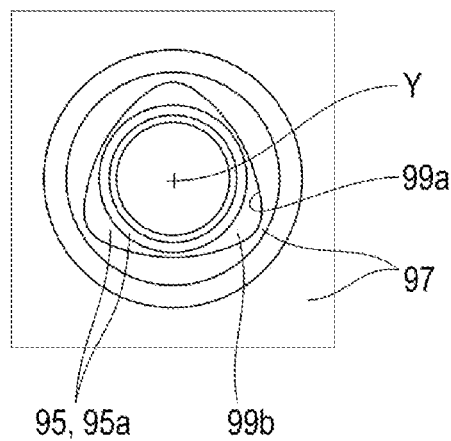
[Fig.10]

AIRCRAFT TURBOMACHINE WITH MECHANICAL REDUCTION GEAR

TECHNICAL FIELD OF THE INVENTION

The present invention relates to the field of the mechanical reduction gears for turbomachines, in particular, for aircraft.

TECHNICAL BACKGROUND

The prior art includes, in particular, the documents WO-A1-2010/092263, FR-A1-2 987 416, FR-A1-3 008 462, FR-A1-3 008 463 and FR-A1-3 041 054.

The role of a mechanical reduction gear is to modify the speed and torque ratio between the input axle and the output axle of a mechanical system.

The new generations of dual flow turbomachines, in particular those with a high bypass ratio, comprise a mechanical reduction gear to drive the shaft of a fan. The usual purpose of the reduction gear is to convert the rotational speed referred to as high speed of the shaft of a power turbine into a slower rotational speed for the shaft driving the fan.

Such a reduction gear comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary because their axes of revolution coincide with the longitudinal axis X of the turbomachine. The planet gears each have a different axis of revolution and are equally distributed on the same operating diameter around the axis of the planetary. These axes are parallel to the longitudinal axis X.

There are several reduction gear architectures. In the prior art of the dual flow turbomachines, the reduction gears are of the planetary or epicyclic type. In other similar applications, there are architectures referred to as differential or "compound".

In a planetary reduction gear, the planet carrier is stationary, and the ring gear is the output shaft of the device which rotates in the opposite orientation of the sun gear.

In an epicyclic reduction gear, the ring gear is stationary, and the planet carrier is the output shaft of the device which rotates in the same orientation as the sun gear.

On a compound reduction gear, no element is attached in rotation. The ring gear rotates in the opposite orientation of the sun gear and the planet carrier.

The reduction gears can consist of one or more meshing stages. This meshing is ensured in different ways such as by contact, friction or magnetic field.

In this application, "stage" means a toothing that is configured to mesh with a complementary toothing. A toothing can be internal or external.

A planet gear may comprise one or two meshing stages. A single-stage planet gear comprises a toothing that can be straight, helical or herringbone, and the teeth of which are located on a same diameter. This toothing cooperates with both the sun gear and the ring gear.

A double-stage planet gear comprises two toothings that are located on different diameters. A first toothing cooperates with the sun gear and a second toothing cooperates with the ring gear.

Each of the toothing of a planet gear may comprise a single series of teeth or two independent series of teeth, i.e., at an axial distance from each other. A planet gear has already been proposed, the meshing toothing of which with the sun gear comprise two series of teeth arranged on either side of a median plane of the planet gear, and the meshing toothing of which with the ring gear also comprise two series of teeth arranged on either side of this plane, the two toothing of each planet gear having different diameters.

A reduction gear with a meshing double-stage has the advantage of having a higher reduction ratio than a reduction gear with a single meshing stage of the same size. However, a disadvantage of this type of reduction gear is the moment generated in the planet gears by differences in forces applied to the stages of the planet gears.

The document US-A1-2021/310417 proposes replacing a single planet gear with a pair of coaxial planet gears mounted on spade heads as shown in FIG. 17. The document DE-63-10 2017 120336 describes a motor vehicle and not a turbomachine.

The invention is an improvement that allows to further increase the reduction ratio of an aircraft turbomachine mechanical reduction gear while limiting the moments generated in the planet gears.

SUMMARY OF THE INVENTION

The invention relates to an aircraft turbomachine, comprising a mechanical reduction gear comprising:
- a sun gear which has a first axis of rotation centred on a main axis of the turbomachine,
- a ring gear that extends around the sun gear and said first axis,
- planet gears which are meshed with the sun gear and the ring gear, each planet gear having a second axis of rotation parallel to said first axis and comprising a first toothing meshing with the sun gear, and a second toothing meshing with the ring gear, the first toothing of each planet gear comprising two series of teeth which are at an axial distance from one another and which are disposed on either side of a median plane of the planet gear which is perpendicular to the second axis of this planet gear, the second toothing of each planet gear being arranged between the two series of teeth of the first toothing and comprising two series of teeth which are at an axial distance from each other and which are arranged on either side of said median plane of the planet gear, the first toothing of each planet gear having a diameter greater than that of the second toothing of the planet gear,
- a planet carrier which has an axis of rotation coincident with said first axis and which comprises an internal cavity for housing the sun gear, the planet carrier carrying bearings for guiding the planet gears in rotation around their second axes, characterised in that:
the sun gear is coupled to a first rotor shaft of the turbomachine,
the planet carrier is coupled to a second rotor shaft of the turbomachine, and
the ring gear is fixed to a stator of the turbomachine,
and in that each planet gear is preferably guided in rotation by two guide bearings which are respectively, and for example solely, located in line with said two series of teeth of the first toothing of this planet gear.

The invention therefore relates to a reduction gear, the planet gears of which have the particularity of having a (central) toothing of small-diameter that meshes with the ring gear, and a large-diameter (lateral) toothing that meshes with the sun gear. In terms of size, it is understood that using a small diameter for meshing with the ring gear allows to reduce the diameter of the ring gear and therefore the radial size of the reduction gear.

In particular, the invention is in particular compatible with
- a multi-stage reduction gear;
- an epicyclic reduction gear insofar as the ring gear is fixed;
- straight or herringbone toothing.

The turbomachine according to the invention may comprise one or more of the following characteristics, taken in isolation from each other, or in combination with each other:
- said median plane is a median plane of symmetry;
- the sun gear comprises a toothing formed by two series of teeth which are at an axial distance from each other and which mesh respectively with the two series of teeth of the first toothing of each planet gear;
- the ring gear comprises a toothing formed by two series of teeth which are at an axial distance from each other and which mesh respectively with the two series of teeth of the second toothing of each planet gear;
- the ring gear has a front half-ring gear and a rear half-ring gear, the half-ring gears being symmetrical and being arranged between the two series of teeth of the first toothing of each planet gear;
- each of the planet gear is formed from a single piece;
- each of the planet gear is formed by the assembly of at least three parts, including:
  - a tubular part centred on the second axis, this tubular part comprising a median portion comprising the two series of teeth of the second toothing, and
  - two annular webs which are centred on the second axis and extend to the two opposite axial ends of the first part, these annular webs respectively comprising at their external peripheries the two series of teeth of the first toothing;
- the annular webs each comprise, at their internal peripheries, a non-circular housing which cooperates in a complementary manner with at least one protuberance on the corresponding end of the tubular part so that the annular webs are secured in rotation with the tubular part;
- each of the planet gears comprises two internal cylindrical surfaces which are at an axial distance from each other and respectively form rolling surfaces of rolling bearings, or guiding surfaces of hydrodynamic bearings.
- said surfaces are located respectively in two planes which are perpendicular to the second axis and which pass through the two series of teeth of the second toothing of the planet gear;
- the sun gear is generally tubular in shape and comprises at one axial end an annular flange for coupling to said first rotor shaft;
- the two series of teeth in each toothing are herringbone-shaped;
- the planet carrier comprises two discs and the planet gears extend axially between the discs and are attached to these discs;
  - the two guide bearings of a planet gear do not extend inside the second toothing of this planet gear;
- said surfaces are separated from each other by an axial distance which is greater than an axial dimension of each of these surfaces;
  - said bearings are separated from each other by an axial distance which is greater than an axial dimension of each of said bearings;
  - said surfaces are separated from each other by an axial distance which represents at least 80% of an axial dimension of the second toothing;
  - said bearings are separated from each other by an axial distance which represents at least 80% of an axial dimension of the second toothing;
  - the planet gears cylindrical bodies extend axially between the discs and are fixed to these discs;
  - the planet gears cylindrical bodies are distributed around the first axis and define said second axes, these cylindrical bodies respectively passing through the planet gears with a view to guiding them;
  - the shape complementarity is of the P3G connection type.

BRIEF DESCRIPTION OF THE FIGURES

Further characteristics and advantages will be apparent from the following description of a non-limiting embodiment of the invention with reference to the appended drawings in which:

FIG. 1 is a schematic axial sectional view of a turbomachine using the invention, FIG. 2 is a partial axial sectional view of a mechanical reduction gear, FIG. 3 is another partial axial sectional view of a mechanical reduction gear, and illustrates the prior art of the present invention, FIG. 4 is a schematic axial cross-sectional and perspective view of a symmetrical meshing double-stage reduction gear, and also illustrates the prior art of the present invention, FIG. 5 is another schematic axial section view of the reduction gear in FIG. 4;

FIG. 6 is a very schematic partial axial section view of a reduction gear according to the invention, FIG. 7 is a very schematic partial axial section view of a turbomachine according to the invention, FIG. 8 is a schematic perspective view of a reduction gear in axial section, according to one embodiment of the invention, FIG. 9 is a schematic perspective view and axial section of a planet gear for a variant of the reduction gear according to the invention, and FIG. 10 is a larger-scale schematic front view of a portion of the planet gear shown in FIG. 9.

DETAILED DESCRIPTION OF THE INVENTION

FIG. 1 describes a turbomachine 1 which conventionally comprises a fan S, a low-pressure compressor 1$a$, a high-pressure compressor 1$b$, an annular combustion chamber 1$c$, a high-pressure turbine 1$d$, a low-pressure turbine 1$e$ and an exhaust nozzle 1$h$. The high-pressure compressor 1$b$ and the high-pressure turbine 1$d$ are connected by a high-pressure shaft 2 and together they form a high-pressure (HP) body. The low-pressure compressor 1$a$ and the low-pressure turbine 1$e$ are connected by a low-pressure shaft 3 and together they form a low-pressure (LP) body.

The fan S is driven by a fan shaft 4 which is driven by the LP shaft 3 by means of a reduction gear 6. This reduction gear 6 is generally of the planetary or epicyclic type.

The following description relates to a reduction gear of the epicyclic type, in which the planet carrier and the sun gear are mobile in rotation, the ring gear of the reduction gear being stationary in the reference frame of the engine.

The reduction gear 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the reduction gear 6. This enclosure E is here closed upstream by joints at the level of a bearing allowing the passage of the fan shaft 4, and downstream by joints at the level of the passage of the LP shaft 3.

FIG. 2 shows an epicyclic reduction gear 6. In the inlet, the reduction gear 6 is connected to the LP shaft 3, for example by means of internal splines 7a. Thus, the LP shaft 3 drives a planetary pinion referred to as the sun gear 7. Classically, the sun gear 7, whose axis of rotation is coincident with that of the turbomachine X, drives a series of pinions referred to as planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of the planet gears 8 is held by a frame referred to as planet carrier 10. Each planet gear 8 rotates around its own axis Y, and meshes with the ring gear 9.

In the output we have:

In this epicyclic configuration, the assembly of planet gears 8 drives the planet carrier 10 in rotation around the axis X of the turbomachine. The ring gear is attached to the engine casing or stator 5 via a ring gear carrier 12 and the planet carrier 10 is attached to the fan shaft 4.

In another planetary configuration, the assembly of the planet gears 8 is held by a planet carrier 10 which is attached to the engine casing or stator 5. Each planet gear 8 drives the ring gear which is fitted to the fan shaft 4 via a ring gear carrier 12.

In another differential configuration, the assembly of the planet gears 8 is held by a planet carrier 10 which is connected to a first fan shaft 5. Each planet gear 8 drives the ring gear 9, which is secured to the fan shaft 4 via the ring gear carrier 12.

Each planet gear 8 is mounted free in rotation by means of a bearing 11, for example of the rolling or hydrodynamic bearing type. Each bearing 11 is mounted on one of the axles 10b of the planet carrier 10 and all axles are positioned relative to each other using one or more structural frame 10a of the planet carrier 10. There are a number of axles 10b and bearings 11 equal to the number of planet gears. For reasons of operation, mounting, manufacture, inspection, repair or replacement, the axles 10b and the frame 10a can be separated into several parts.

For the same reasons mentioned above, the toothing of a planet gear can be separated into several propellers or teeth each with a median plane P, P'. In our example, we detail the operation of a reduction gear in which each planet gear comprises two series of herringbone teeth cooperating with a ring gear separated into two half-ring gears:

an upstream half-ring gear 9a consisting of a rim 9aa and a mounting half-flange 9ab. On the rim 9aa is the front propeller meshed with a propeller of the toothing 8d of each planet gear 8. The propeller of the toothing 8d also meshes with that of the sun gear 7.

A downstream half-ring gear 9b consisting of a rim 9ba and a mounting half-flange 9bb. On the rim 9ba is the rear propeller meshed with a propeller of the toothing 8d of each planet gear 8. The propeller of the toothing 8d also meshes with that of the sun gear 7.

If the propeller widths vary between the sun gear 7, the planet gears 8 and the ring gear 9 because of the toothing overlaps, they are all centred on a median plane P for the upstream teeth and on another median plane P' for the downstream teeth.

FIG. 2 thus illustrates the case of a meshing single-stage reduction gear 6, i.e., a same toothing 8d of each planet gear 8 cooperates with both the sun gear 7 and the ring gear 9. Even though the toothing 8d comprises two series of teeth, these teeth have the same average diameter and form a single toothing referred to as herringbone.

The mounting half-flange 9ab of the upstream ring gear 9a and the mounting half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the conveying of the oil in the reduction gear 6. The oil enters the reduction gear 6 from the stator portion 5 into a distributor 13 by different means which will not be specified in this view because they are specific to one or more types of architecture. The distributor 13 comprises injectors 13a and arms 13b. The function of the injectors 13a is to lubricate the toothings and the function of the arms 13b is to lubricate the bearings. The oil is fed towards the injector 13a and exits through the end 13c to lubricate the toothings. The oil is also fed towards the arm 13b and circulates via the supply mouth 13d of the bearing. The oil then circulates through the axle into one or more buffer areas 10c and exit out through the orifices 10d in order to lubricate the bearings of the planet gears.

FIG. 3 shows another example of reduction gear architecture 6, referred to as a double stage meshing, in which each planet gear 8 comprises two separate toothing 8d1, 8d2 configured to cooperate respectively with the ring gear 9 and the sun gear 7.

In this FIG. 3, the elements already described in the foregoing are designated by the same references.

The toothing 8d1 meshing with the ring gear 9 has an average diameter noted D2 and is located in a median plane P. The toothing 8d2 meshing with the sun gear 7 has an average diameter noted D1 and is located in another median plane P'. The median planes P, P' are parallel to each other and perpendicular to the axis X. The diameter D2 is smaller than the diameter D1. Finally, each toothing 8d1, 8d2 comprises a single helix or series of teeth.

As mentioned above, this "double-stage" architecture generates significant moments at the level of the planet gears 8 in particular because this dual-stage has asymmetrical toothing.

FIGS. 4 and 5 show a reduction gear 60 with symmetrical double toothing, which allows to solve the above problem.

This reduction gear 60 comprises:

a sun gear 70 having an axis of rotation X, a ring gear 90 which extends around the sun gear 70 and which is configured so that it cannot rotate around the axis X, and planet gears 80 which are meshed with the sun gear 70 and the ring gear 90 and which are maintained by a planet carrier 100 which is configured to be mobile in rotation around the axis X.

The plane H is defined as a median plane perpendicular to the axis X and passing substantially through the middle of the reduction gear 60 (FIG. 5).

The sun gear 70 comprises internal splines 70a for coupling with the LP shaft 30 as well as an external toothing 70b for meshing with the planet gears 80. The toothing 70b have two series of adjacent herringbone teeth, separated from each other by an annular groove 72 oriented radially outwards. The toothing 70b is symmetrical with respect to the plane H, its teeth being located on either side of the plane H which passes through the groove 72.

The ring gear 90 is formed by two independent annulus 90a, 90b and comprises a toothing 90d which is separated into two series of herringbone teeth 90d1, 90d2 carried respectively by the two annulus.

The annulus 90a, 90b are arranged symmetrically with respect to the plane H which thus extends between these annulus. The annulus are connected and attached to a ring gear carrier 120 by means of annular connecting flasks 122. The flasks 122 are independent of each other, each flask having a general S-shape in axial half-section providing it with a certain radial flexibility by elastic deformation during operation.

Each annulus 90a, 90b extends around the axis X and is attached to the corresponding flask 122 by its external periphery. Its internal periphery comprises one of the series of teeth 90d1, 90d2.

As with the ring gear 90, the ring gear carrier 120 is symmetrical with respect to the plane H.

Each planet gear 80 comprises a first toothing 82 of average diameter D1 for meshing with the sun gear 70, and a second toothing 84 of average diameter D2, different from D1 and in particular smaller than D1, for meshing with the ring gear 90. The average diameters are measured from the axis Y of each planet gear 80 and each represent the average between the maximum diameter and the minimum diameter of a toothing of this planet gear.

Each planet gear 80 comprises a cylindrical sleeve 86 and an annular web 88 extending substantially radially outwards from the middle of this sleeve 86. The toothing 84 is separated into two series of herringbone teeth 84d1, 84d2 which are located respectively on the axial ends of the sleeve 86. The toothing 82 comprises two series of herringbone teeth 82d1, 82d2 which are located at the external periphery of the web 88 and which are separated from each other by an annular groove 89 opening radially outwards with respect to the axis Y.

The toothing 82 is passed through in its middle by the plane H which passes through the groove 89, the teeth 82d1, 82d2 being thus arranged on either side of the plane H. The teeth 84d1, 84d2 are also arranged symmetrically with respect to the plane H.

The toothing 82 and the external periphery of the web 88 have an axial dimension which is smaller than the axial distance between the annulus 90a, 90b as well as between the flasks 122, so that each planet gear 80 can rotate freely in the ring gear carrier 120 and between the annulus 90a, 90b and the flasks 122.

Each of the planet gears 80 is guided in rotation by a hydrodynamic bearing 81 which comprises a cylindrical body 81a which passes through the planet gear 80, and in particular its sleeve 86, and which is configured to form a guiding oil film inside the planet gear.

The body 81a of a bearing 81 extends along the axis Y and comprises at its longitudinal ends extensions 81b housed in orifices forming seats of the planet carrier 100.

The body 81a is generally tubular and comprises an internal oil circulation cavity which generally communicates with first oil fed pipelines to an external cylindrical surface of the body 81a for the formation of the oil film between that surface and an internal cylindrical surface of the planet gear 80.

FIGS. 6 and 7 illustrate the general principle of the invention. FIG. 6 shows a mechanical reduction gear 60 on its own and FIG. 7 shows a turbomachine 1 comprising this reduction gear 60.

The turbomachine 1 is similar to that shown in FIG. 1, so the above description in relation to FIG. 1 applies to the turbomachine 1 in FIG. 7.

In the present case, the reduction gear 60 in FIGS. 6 and 7 is an epicyclic reduction gear, i.e., its ring gear 90 is fixed and its planet carrier 100 is mobile in rotation. The reduction gear 60 comprises:
- a sun gear 70 which has a first axis X of rotation centred on the main axis of the turbomachine 1.
- a ring gear 90 extending around the sun gear 70 and the first axis X,
- planet gears 80 which are meshed with the sun gear 70 and the ring gear 90, and
- a planet carrier 100 whose axis of rotation coincides with the first axis X and which comprises an internal cavity for housing the sun gear 70, the planet carrier 100 carrying bearings 81 for guiding the planet gears 80 in rotation around the second axes Y.

The sun gear 70 is coupled to a first rotor shaft of the turbomachine 1, in this case the low-pressure shaft 3.

The planet carrier 100 is coupled to a second rotor shaft of the turbomachine 1, in this case the fan shaft 4.

The ring gear 90 is fixed to a stator of the turbomachine 1. In the example shown, it is fixed to an intermediate casing 15 or to an inlet casing of the turbomachine 1.

Each planet gear 80 has a second axis Y of rotation parallel to the first axis X and comprises a first toothing 82 meshing with the sun gear 70, and a second toothing 84 meshing with the ring gear 90.

The first toothing 82 of each planet gear 80 comprises two series of teeth 82d1, 82d2 which are at an axial distance from each other, and which are arranged on either side of the median plane H of the planet gear 80.

The second toothing 84 of each planet gear 80 is arranged between the two series of teeth 82a, 82b of the first toothing 82 and comprises two series of teeth 84d1, 84d2 which are an axial distance from each other and arranged on either side of the median plane H.

The median plane H is perpendicular to the axis Y of the planet gear 80 and may be a plane of symmetry of the planet gear 80.

The first toothing 82 of each planet gear 80 has a diameter D1 which is greater than the diameter D2 of the second toothing 84 of the planet gear 80.

In FIG. 7, it can be seen that the toothing 70b of the sun gear 70 is formed by two series of teeth 70b1, 70b2 which are at an axial distance from each other and which mesh respectively with the two series of teeth 82d1, 82d2 of the first toothing 82 of each planet gear 80.

It can also be seen that the ring gear 90 passes between the two series of teeth 82d1, 82d2 of the first toothing 82 of each planet gear 80, which reduces the size of the reduction gear 60.

Reference is now made to FIG. 8, which illustrates a more specific embodiment of a reduction gear 60 for the turbomachine 1 according to the invention.

It can be seen that the ring gear 90 comprises a toothing 90d formed by two series of teeth 90d1, 90d2 which are at an axial distance from each other and which mesh respectively with the two series of teeth 84d1, 84d2 of the second toothing 84 of each planet gear 80.

The ring gear 90 is separated into two half-ring gears:
an upstream half-ring gear 90a consisting of a rim 90aa and a mounting half-flange 90ab. On the rim 90aa there is the first series of teeth 90d1 of the toothing 90d which is meshed with one of the series of teeth 84d1 of the second toothing 84 of each planet gear 80;

a downstream half-ring gear 90b consisting of a rim 90ba and a mounting half-flange 90bb. On the rim 90ba is the second series of teeth 90d2 of the toothing 90d which is meshed with the other of the series of teeth 84d2 of the second toothing 84 of each planet gear 80.

The two half-ring gears 90a, 90b are symmetrical and arranged between the two series of teeth 82d1, 82d2 of the first toothing 82 of each planet gear 80.

The series of teeth 82d1, 82d2, 84d1, 84d2 of the toothings 82, 84 are herringbone-shaped. This is also the case for the series of teeth 70b1, 70b2, 90d1, 90d2 of the toothings 70b, 90d.

In the example shown, each of the planet gears 80 is formed from a single piece.

Alternatively, the ring gear 90 could also be formed in a single piece.

The planet carrier 100 comprises two discs 100a and cylindrical bodies 81a which extend between the discs 100a and are fixed to these discs. The cylindrical bodies 81a are distributed around the axis and define the axes Y. These bodies 81a pass through the planet gears 80 to guide them.

Each of the planet gears 80 is centred and guided in rotation by rolling bearings 91 mounted around a cylindrical body 81a.

In the example shown, there are two bearings 91 per planet gear 80.

The bearings 91 are preferably located respectively in line with the two series of teeth 82d1, 82d2 of the first toothing 82 of each planet gear 80.

The body 81a extends along the axis Y and comprises at its longitudinal ends of the extensions 81b housed in the orifices forming seats of the planet carrier 100.

The body 81a is generally tubular and comprises an internal cavity of oil circulation which generally communicates with pipes for supplying oil to an external cylindrical surface of the body 81a for lubrication of the rolling bearings 91.

The rolling bearings 91 are roller bearings and comprise rolling elements (rollers) which are mounted in an internal cage integrated into the body 81a and which roll respectively on two internal cylindrical surfaces 93a, 93b of the planet gear 80.

The surfaces 93a, 93b are at an axial distance from each other, on either side of the plane H, and are located respectively in two planes Q1, Q2 which are perpendicular to the second axis Y and which pass through the two series of teeth 82d1, 82d2 of the first toothing 82 of the planet gear 80.

The surfaces 93a, 93b are separated from each other by an axial distance which is greater than an axial dimension of each of these surfaces. These surfaces are separated from each other by an axial distance which represents at least 80% of an axial dimension of the second toothing 84.

The use of symmetrical double-stage planet gears 80 limits the occurrence of moments on the bearings 91.

The sun gear 70 is generally tubular in shape and comprises at one axial end an annular flange 94 for coupling to the aforementioned first rotor shaft 3.

Reference is now made to FIGS. 9 and 10, which illustrate an alternative embodiment for the planet gears 80 of the reduction gear 60. The reduction gear shown in FIG. 8 can be fitted with the planet gears 80 shown in FIGS. 9 and 10.

In the example shown, each of the planet gears 80 is formed by assembling at least three parts, including:
a tubular part 95 centred on the second axis Y, this tubular part 95 comprising a median portion 95a comprising the two series of teeth 84d1, 84d2 of the second toothing 84, and two annular webs 97 which are centred on the second axis Y and which are mounted respectively on two opposite axial ends 95b of the first part 92, these annular web-shaped annular webs 97 comprising respectively at their external peripheries the two series of teeth 82d1, 82d2 of the first toothing 82.

The internal peripheries of each of the annular webs 97 comprise a non-circular housing 99a, for example with protuberances, which cooperates in a form-fitting manner with a protuberance 99b on the corresponding end 95b of the tubular part 95 so that the disc-shaped annular webs 97 are rotationally secured to the tubular part 95. This complementarity of forms is, for example, of the P3G connection type.

Each of the planet gears 80 comprises two internal cylindrical surfaces 93a, 93b which are at an axial distance from each other and respectively form rolling surfaces of rolling bearings. These surfaces 93a, 93b are located respectively in two planes Q1, Q2 which are perpendicular to the second axis Y and which pass through the two series of teeth 82d1, 82d2 of the first toothing 82 of the planet gear 80.

The surfaces 93a, 93b are separated from each other by an axial distance which is greater than an axial dimension of each of these surfaces. These surfaces are separated from each other by an axial distance which represents more than 100% of an axial dimension of the second toothing 84.

In another embodiment not shown, the guide bearings of the planet gears could be hydrodynamic bearings, as illustrated in particular in FIG. 5.

The reduction gear according to the invention is adapted to provide high reduction ratios, for example greater than 5. It has a small radial size, making it easy to integrate into a turbomachine. The turbomachine is preferably dual-flow.

The invention claimed is:

1. An aircraft turbomachine, comprising a mechanical reduction gear comprising:
a sun gear which has a first axis of rotation centered on a main axis of the turbomachine,
a ring gear that extends around the sun gear and said first axis,
planet gears which are meshed with the sun gear and the ring gear, each planet gear having a second axis of rotation parallel to said first axis and comprising a first toothing meshing with the sun gear, and a second toothing meshing with the ring gear, the first toothing of each planet gear comprising two series of teeth which are at an axial distance from one another and which are disposed on either side of a median plane of the planet gear which is perpendicular to the second axis of this planet gear, the second toothing of each planet gear being arranged between the two series of teeth of the first toothing and comprising two series of teeth which are at an axial distance from each other and which are arranged on either side of said median plane of the planet gear, the first toothing of each planet gear having a diameter greater than that of the second toothing of the planet gear,
a planet carrier which has an axis of rotation coincident with said first axis and which comprises an internal cavity for housing the sun gear, the planet carrier carrying bearings for guiding the planet gears in rotation around their second axes, wherein:
the sun gear is coupled to a first rotor shaft of the turbomachine,
the planet carrier is coupled to a second rotor shaft of the turbomachine, and
the ring gear is fixed to a stator of the turbomachine,
wherein each planet gear is guided in rotation by two guide bearings which are respectively located in line with said two series of teeth of the first toothing of this planet gear,
wherein each of the planet gears is formed in a single piece, and
wherein the axial dimensions of the two guide bearings are each located radially within both the first and second toothing, respectively.

2. The turbomachine according to claim 1, wherein said median plane is a median plane of symmetry.

3. The turbomachine according to claim 1, wherein the sun gear comprises a toothing formed by two series of teeth which are at an axial distance from each other and which mesh respectively with the two series of teeth of the first toothing of each planet gear.

4. The turbomachine according to claim 1, wherein the ring gear comprises a toothing formed by two series of teeth which are at an axial distance from each other and which mesh respectively with the two series of teeth of the second toothing of each planet gear.

5. The turbomachine according to claim 1, wherein the ring gear has a front half-ring gear and a rear half-ring gear, the half-ring gears being symmetrical and being arranged between the two series of teeth of the first toothing of each planet gear.

6. The turbomachine according to claim 1, wherein each of the planet gears comprises two internal cylindrical surfaces which are at an axial distance from each other and respectively form rolling surfaces of rolling bearings, or guiding surfaces of hydrodynamic bearings.

7. The turbomachine according to claim 1, wherein the sun gear is generally tubular in shape and comprises at one axial end an annular flange for coupling to said first rotor shaft.

8. The turbomachine according to claim 1, wherein the two series of teeth of each toothing are herringbone-shaped.

9. The turbomachine according to claim 1, wherein the planet carrier comprises two discs and the planet gears extend axially between the discs and are attached to these discs.

* * * * *